US010415640B2

(12) United States Patent
Homma et al.

(10) Patent No.: US 10,415,640 B2
(45) Date of Patent: Sep. 17, 2019

(54) MOTION GUIDE DEVICE AND ACTUATOR

(71) Applicant: THK CO., LTD., Tokyo (JP)

(72) Inventors: Kazuto Homma, Tokyo (JP); Akimasa Yoshida, Tokyo (JP); Daisuke Yatsushiro, Tokyo (JP); Takuya Iguchi, Tokyo (JP)

(73) Assignee: THK CO., LTD., Tokyo (JP)

( * ) Notice: Subject to any disclaimer, the term of this patent is extended or adjusted under 35 U.S.C. 154(b) by 0 days.

(21) Appl. No.: 15/774,693

(22) PCT Filed: Nov. 22, 2016

(86) PCT No.: PCT/JP2016/004944
§ 371 (c)(1),
(2) Date: May 9, 2018

(87) PCT Pub. No.: WO2017/094239
PCT Pub. Date: Jun. 8, 2017

(65) Prior Publication Data
US 2018/0355959 A1 Dec. 13, 2018

(30) Foreign Application Priority Data
Nov. 30, 2015 (JP) .................. 2015-233142
Nov. 16, 2016 (JP) .................. 2016-222882

(51) Int. Cl.
F16C 29/06 (2006.01)
F16C 29/00 (2006.01)
(Continued)

(52) U.S. Cl.
CPC ............ F16C 29/0602 (2013.01); C08J 5/04 (2013.01); F16C 29/005 (2013.01); F16C 29/06 (2013.01);
(Continued)

(58) Field of Classification Search
CPC .. F16C 29/06; F16C 29/0602; F16C 29/0633; F16C 29/005; F16C 33/62; F16C 33/64
See application file for complete search history.

(56) References Cited

U.S. PATENT DOCUMENTS 7,845,854 B2 * 12/2010 Shirai .................. F16C 29/005
384/43
2005/0037225 A1 2/2005 Rajabali
(Continued)

FOREIGN PATENT DOCUMENTS

| CN | 101641526 A | 2/2010 |
| CN | 104271972 A | 1/2015 |

(Continued)

OTHER PUBLICATIONS

International Search Report dated Feb. 28, 2017, issued in Counterpart of International Application No. PCT/JP2016/004944 (2 pages).
(Continued)

Primary Examiner — James Plikington
(74) Attorney, Agent, or Firm — Westerman, Hattori, Daniels & Adrian, LLP

(57) ABSTRACT

A track member or a movable member constituting a motion guide device includes a rolling part formed of a metal material contacting with a plurality of rolling bodies and forming a rolling body rolling surface a, a mounting part formed of a metal material having a mounting hole for mounting an external member, and a track body or a movable body formed of FRP jointed with the rolling part and the mounting part and forming the track member or the movable member, and the mounting part and the track body or the movable body have joint holes, opened in a direction orthogonal to a lamination direction of FRP reinforced fiber sheets S forming the track body or the movable body at a
(Continued)

time of the joint, and can be jointed using jointing means. An external member can be securely mounted to the motion guide device formed of FRP.

6 Claims, 17 Drawing Sheets

(51) Int. Cl.
*F16H 25/22* (2006.01)
*C08J 5/04* (2006.01)
*F16C 33/62* (2006.01)
*F16C 35/00* (2006.01)
*F16H 25/20* (2006.01)

(52) U.S. Cl.
CPC ............ *F16C 29/063* (2013.01); *F16C 33/62* (2013.01); *F16C 35/00* (2013.01); *F16H 25/22* (2013.01); *F16H 25/2228* (2013.01); *F16H 25/2238* (2013.01); *F16C 29/0609* (2013.01); *F16C 2208/82* (2013.01); *F16C 2226/40* (2013.01); *F16C 2226/54* (2013.01); *F16C 2226/60* (2013.01); *F16H 2025/2031* (2013.01)

(56) References Cited

U.S. PATENT DOCUMENTS

| | | |
|---|---|---|
| 2005/0054468 A1 | 3/2005 | Nagai et al. |
| 2005/0190997 A1 | 9/2005 | Yamguchi et al. |
| 2006/0232141 A1 | 10/2006 | Teramachi et al. |
| 2009/0100949 A1* | 4/2009 | Shirai .................. F16C 29/005 74/89.14 |
| 2010/0150483 A1 | 6/2010 | Aida et al. |
| 2013/0129409 A1 | 5/2013 | Cho et al. |
| 2015/0093055 A1 | 4/2015 | Ikegami et al. |

FOREIGN PATENT DOCUMENTS

| | | |
|---|---|---|
| JP | 60-78108 A | 5/1985 |
| JP | 63-75475 U | 5/1988 |
| JP | 3-5100 U | 1/1991 |
| JP | 2003-206926 A | 7/2003 |
| JP | 2004-312983 A | 11/2004 |
| JP | 2005-59596 A | 3/2005 |
| JP | 2005-106284 A | 4/2005 |
| JP | 2005-282677 A | 10/2005 |
| JP | 2008-298193 A | 12/2008 |
| JP | 4813373 B2 | 11/2011 |

OTHER PUBLICATIONS

Office Action dated Oct. 30, 2018, issued in counterpart Japanese Application No. 2017-174594, with English machine translation. (4 pages).
Office Action dated Jul. 3, 2018, issued in counterpart Japanese Application No. 2017-174594, with English machine translation. (4 pages).
Office Action dated Feb. 27, 2019, issued in counterpart CN Application No. 201680060185.2, with partial English translation. (8 pages).

* cited by examiner (a)

(b)

(c)

(SECTION A-A)

MOTION GUIDE DEVICE AND ACTUATOR

TECHNICAL FIELD

The present invention relates to a motion guide device and an actuator incorporating the motion guide device.

BACKGROUND ART

Conventionally, in motion guide devices such as a linear guide, a linear guide device, a ball spline device, and a ball screw device, since members constituting such a device move with repeated rolling and sliding motions, a high hardness metal material such as high-carbon chromium bearing steel, stainless steel, or case-hardening steel has been used for the structural members.

However, due to the requirement for expanding the application range of motion guide devices in recent years, lightweight devices are particularly required, and ideas for reducing weight have been proposed to respond to this requirement. For example, Patent Literature 1 of this applicant discloses a motion guide device using fiber reinforced plastics (FRP) that is a material having strength and rigidity equivalent to those of a metal material such as steel, and also achieves weight reduction. This FRP reinforces plastics by using fiber and resin, can significantly improve strength, and is a material used in various fields such as a space and aviation industry, a motorcycle industry, an automobile industry, a railway industry, and a construction industry, and a medical field. However, conventional FRP has been inferior in abrasion resistance as compared with metal materials. For this reason, the applicant has developed a technique for using FRP to motion guide devices, and proposed a motion guide device achieving weight reduction that was not able to be achieved by the technology using only metal materials in Patent Literature 1.

CITATION LIST

Patent Literature

Patent Literature 1: JP 4813373 B

DISCLOSURE OF THE INVENTION

Problems to be Solved By the Invention

Incidentally, when an external member is mounted on a constituting member of an FRP motion guide device, a screw hole has been formed by inserting a helisert in the FRP lamination surface, and the external member has been installed using the screw hole. However, the helisert embedded by being inserted in the FRP lamination surface has a difficulty in ensuring the strength because the helisert itself rotates when tightened with torque equal to or greater than a control value of fastening torque. In other words, a motion guide device formed of FRP needs to be provided with means for securely mounting an external member.

The present invention has been made in view of the above problem in the conventional technique, and is to provide a motion guide device formed of FRP with means for securely mounting an external member.

Means for Solving the Problems

A motion guide device according to the present invention is a motion guide device including a track member, and a movable member mounted on the track member so as to freely move via a plurality of rolling bodies, in which the track member or the movable member includes a rolling part formed of a metal material contacting with the plurality of rolling bodies and forming a rolling body rolling surface, a mounting part formed of a metal material having a mounting hole for mounting an external member, and a track body or a movable body formed of FRP jointed with the rolling part and the mounting part and forming the track member or the movable member, and the mounting part and the track body or the movable body each have a joint hole opened in a direction orthogonal to a lamination direction of FRP reinforced fiber sheets forming the track body or the movable body at a time of the joint, and can be jointed using jointing means placed in the joint holes.

Another motion guide device according to the present invention is a motion guide device including a track member, and a movable member mounted on the track member so as to freely move via a plurality of rolling bodies, in which the track member or the movable member includes a rolling part formed of a metal material contacting with the plurality of rolling bodies and forming a rolling body rolling surface, a mounting part formed of a metal material having a mounting hole for mounting an external member, and a track body or a movable body formed of FRP jointed with the rolling part and the mounting part and forming the track member or the movable member, and the mounting part and the track body or the movable body each have a joint surface extending in a direction parallel to a lamination direction of FRP reinforced fiber sheets forming the track body or the movable body at a time of the joint, and can be jointed using jointing means applied to the joint surfaces.

In the present invention, it is possible to constitute an actuator by incorporating either of the above motion guide devices.

Effects of the Invention

According to the present invention, it is possible to provide a motion guide device formed of FRP with means for securely mounting an external member. Furthermore, according to the present invention, it is possible to provide an actuator incorporating the motion guide device.

BRIEF DESCRIPTION OF THE DRAWINGS

FIG. 11(a) shows that a mounting part is not being mounted to a stepped machining portion, and FIG. 11(b) shows that the mounting part is being mounted to the stepped machining portion.

FIG. 12(a) is a perspective view showing the overall structure of the motion guide device, FIG. 12(b) is a vertical sectional view of a main portion showing the vicinity of a bolt mounting hole, and FIG. 12(c) is a schematic view for explaining the characteristics of FRP that is a constituting member of a track rail.

FIG. 15(a) is an exploded perspective view showing the bottom surface side of the track rail before assembly, FIG. 15(b) is a perspective view showing the bottom surface side of the track rail after assembly, and FIG. 15(c) is a perspective view showing the upper surface side of the track rail after assembly.

MODE FOR CARRYING OUT THE INVENTION

Hereinafter, preferred embodiments for carrying out the present invention will be described with reference to the drawings. Note that, the following embodiments do not limit the invention according to each claim and all combinations of features described in the embodiments are not necessarily required for the solution means of the invention.

A "motion guide device" in this specification includes devices that moves with any rolling and sliding motions such as general rolling bearings used for machine tools, non-lubricant bearings used in vacuum, linear guides, linear guide devices, ball spline devices, ball screw devices, and roller rings.

First Embodiment

Figure 1:
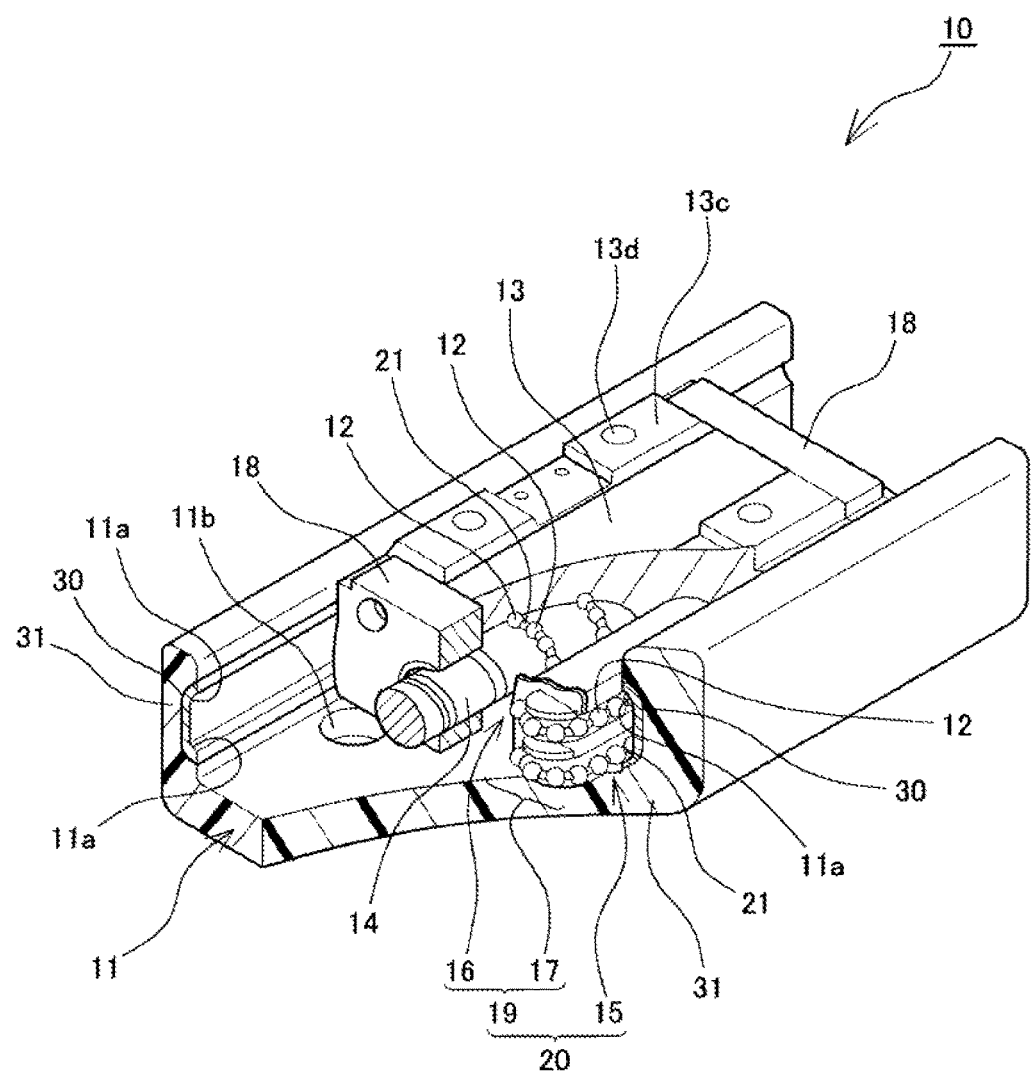
FIG. 1 is a perspective cutaway view for explaining a schematic structure of a motion guide device according to a first embodiment.
Figure 2:
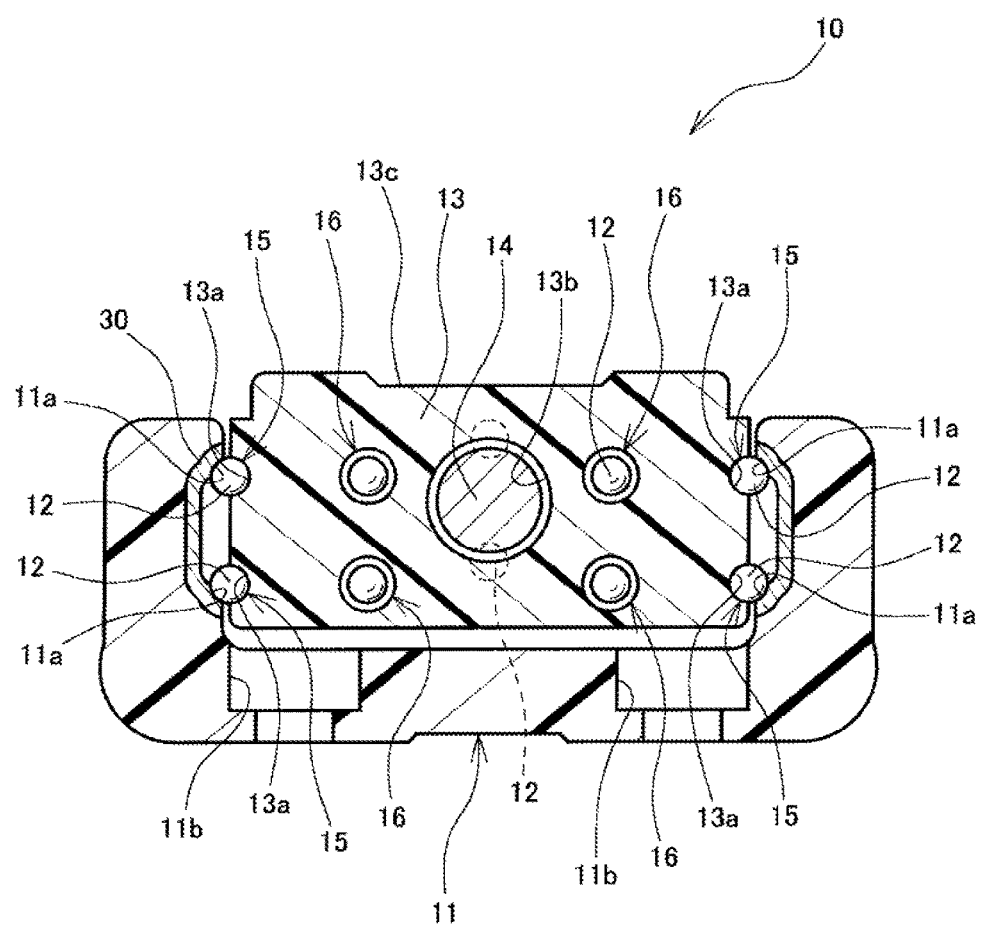
FIG. 2 is a vertical sectional view of the motion guide device according to the first embodiment.

FIGS. 1 and 2 are views showing an example of a motion guide device according to a first embodiment. Particularly, FIG. 1 is a perspective cutaway view for explaining a schematic structure of the motion guide device according to the first embodiment, and FIG. 2 is a vertical sectional view of the motion guide device according to the first embodiment.

A motion guide device 10 is the motion guide device 10 having an integral structure in which a linear motion guide and a ball screw are combined. By connecting the ball screw to a motor (not illustrated), the motion guide device 10 functions as an actuator according to the present invention.

As a main structure, the motion guide device 10 according to the first embodiment includes a track rail 11 as a track member and a movable member 13 mounted on the track rail 11 so as to freely move via a plurality of balls 12 as rolling bodies. In addition, an opening 13b in which a spiral screw groove is formed is provided in the center portion of the movable member 13. The opening 13b is provided with a screw shaft 14 which is inserted through the opening 13b and is mounted so as to freely rotate and move via the balls 12.

The track rail 11 is an elongated member having a substantially U-shaped vertical section, and two rolling-body rolling grooves 11a capable of accommodating the balls 12 are formed on each inner side surface of the track rail 11 over the entire length of the track rail 11. A plurality of bolt mounting holes 11b are formed on the bottom surface side of the substantially U-shaped vertical section of the track rail 11 at appropriate intervals in the longitudinal direction of the track rail 11. The track rail 11 is to be fixed to a predetermined mounting surface, for example, the upper surface of the bed of a machine tool with bolts (not illustrated) to be screwed into the bolt mounting holes 11b. Although the illustrated track rail 11 is linear, a curved rail may be used.

The movable member 13 is configured as a block having a structure in which a hole is bored in a high-strength metal material such as steel. The movable member 13 is provided with four loaded-rolling-body rolling grooves 13a each opposed to the four rolling-body rolling grooves 11a of the track rail 11. By the combinations of the rolling-body rolling grooves 11a and the loaded-rolling-body rolling grooves 13a, four loaded-rolling-body rolling passages 15 are formed between the track rail 11 and the movable member 13. In addition, a plurality of female screws 13d (three screws shown in FIG. 1, but actually four screws) is formed on an upper surface 13c of the movable member 13. By using these female screws 13d, the movable member 13 is to be fixed to a predetermined mounting surface, for example, the saddle of a machine tool or the lower surface of a table. Note that, the movable member 13 is not limited to the one formed of a metal material alone, but may have a structure including a synthetic resin molded body injection-molded integrally with a high-strength metal material such as steel.

In the movable member 13, four return passages 16 extending in parallel to the four loaded-rolling-body rolling passages 15 are formed. The movable member 13 further has lids 18 on both end faces thereof. By ball guiding grooves (not illustrated), which are each recessed in an arch shape, formed in the lids 18, direction change passages 17 (in FIG. 1, two direction change passage 17 only on one corner side are shown with the lid 18 removed), which are formed so as to each protrude in an arch shape between the loaded-rolling-body rolling passage 15 and the return passage 16, are formed.

The pair of lids 18 is securely fixed as members constituting the end portions of the movable member 13, and therebetween, the direction change passage 17 connecting the loaded-rolling-body rolling passage 15 and the return passage 16 is formed. The return passage 16 and the direction change passage 17 constitute a non-loaded-rolling-body rolling passage 19 of the balls 12, and the combination of the non-loaded-rolling-body rolling passage 19 and the loaded-rolling-body rolling passage 15 constitutes an infinite circulation passage 20.

In addition, between the balls 12 of the motion guide device 10 according to the first embodiment, spacer members 21 which are softer than the balls 12 are placed. Regarding the spacer members 21 shown in FIG. 1, the belt-shaped spacer member 21 is employed as the one placed between the track rail 11 and the movable member 13, whereas the spacer members 21 as retainers inserted one by one between the balls 12 are employed as the ones placed between the movable member 13 and the screw shaft 14. However, the combinations of the types and the installations of the spacer members 21 are not limited to those exemplified in FIG. 1, and spacer balls each having a diameter equal to or less than the diameter of the balls 12 as rolling bodies can be employed. The spacer members 21 placed in this manner can prevent the balls 12 from interfering and colliding with each other, falling off, and the like, achieve the alignment motion of the balls 12, and significantly improve the wear resistance of the motion guide device 10 in combination with the self-lubricating effect of the spacer members 21.

Here, a feature of the motion guide device 10 according to the first embodiment is that, in the track rail 11 as the track member, the vicinity of the rolling body rolling surface (rolling-body rolling groove 11a) contacting with the balls 12 is formed of a metal material, and the other portion is formed of FRP. With this feature, the motion guide device 10 according to the first embodiment can maintain strength and rigidity equal to or higher than those of a conventional motion guide device, and also achieve weight reduction.

Figure 3:
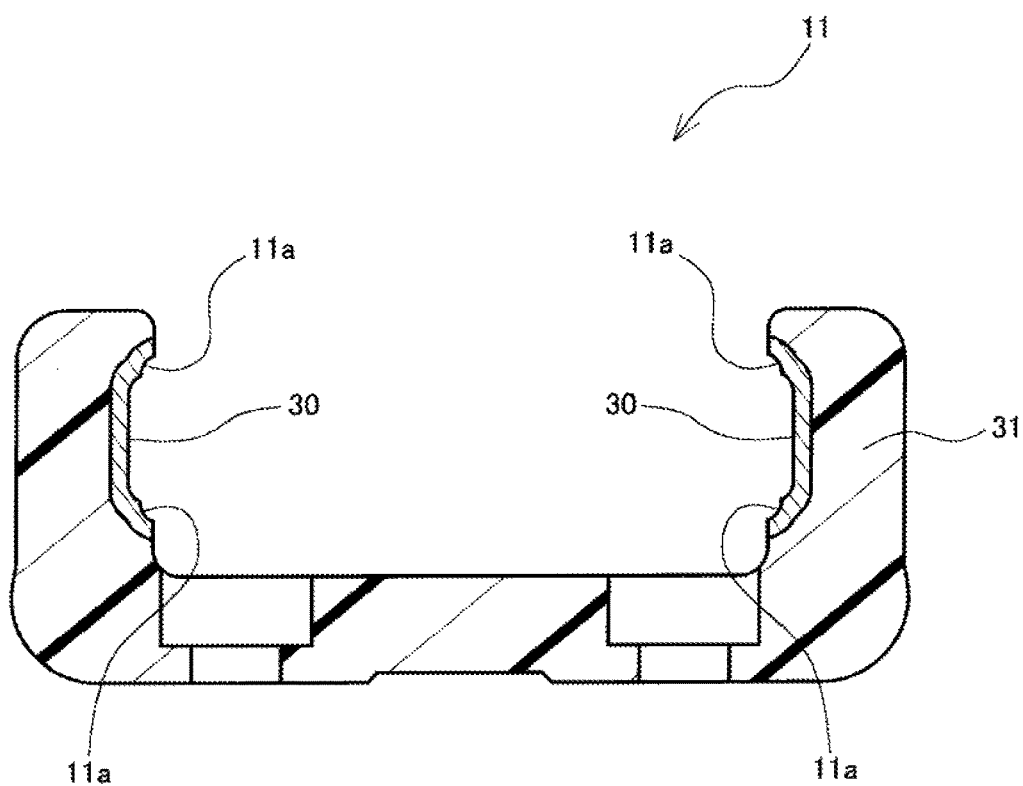
FIG. 3 is a vertical sectional view for explaining a structure of a track rail according to the first embodiment.

The structure of the track rail 11 according to the first embodiment will be described in more detail with reference to FIG. 3. FIG. 3 is a vertical sectional view for explaining the structure of the track rail 11 according to the first embodiment.

The track rail 11 according to the first embodiment is formed by jointing two members of a rolling part 30 formed of a metal material and a track body 31 formed of FRP. The rolling part 30 formed of a metal material is required to have high strength, high rigidity, and further wear resistance. As the metal material used for the rolling part 30, high hardness metal such as high-carbon chromium bearing steel, stainless steel, or case-hardening steel can be used, and aluminum alloy, beryllium copper, titanium alloy or the like can be also used.

On the other hand, the track body 31 is formed of FRP, and this achieves the weight reduction of the motion guide device 10 according to the first embodiment. The type of used FRP is preferably at least one of carbon fiber reinforced plastics (CFRP), glass fiber reinforced plastics (GFRP), and kevlar fiber reinforced plastics (KFRP). In particular, CFRP has excellent strength, and is a preferred material because it is possible to impart strength to a desired shape by changing the lamination direction and the number of layers of carbon fiber, and to further reduce the weight.

Figure 4:
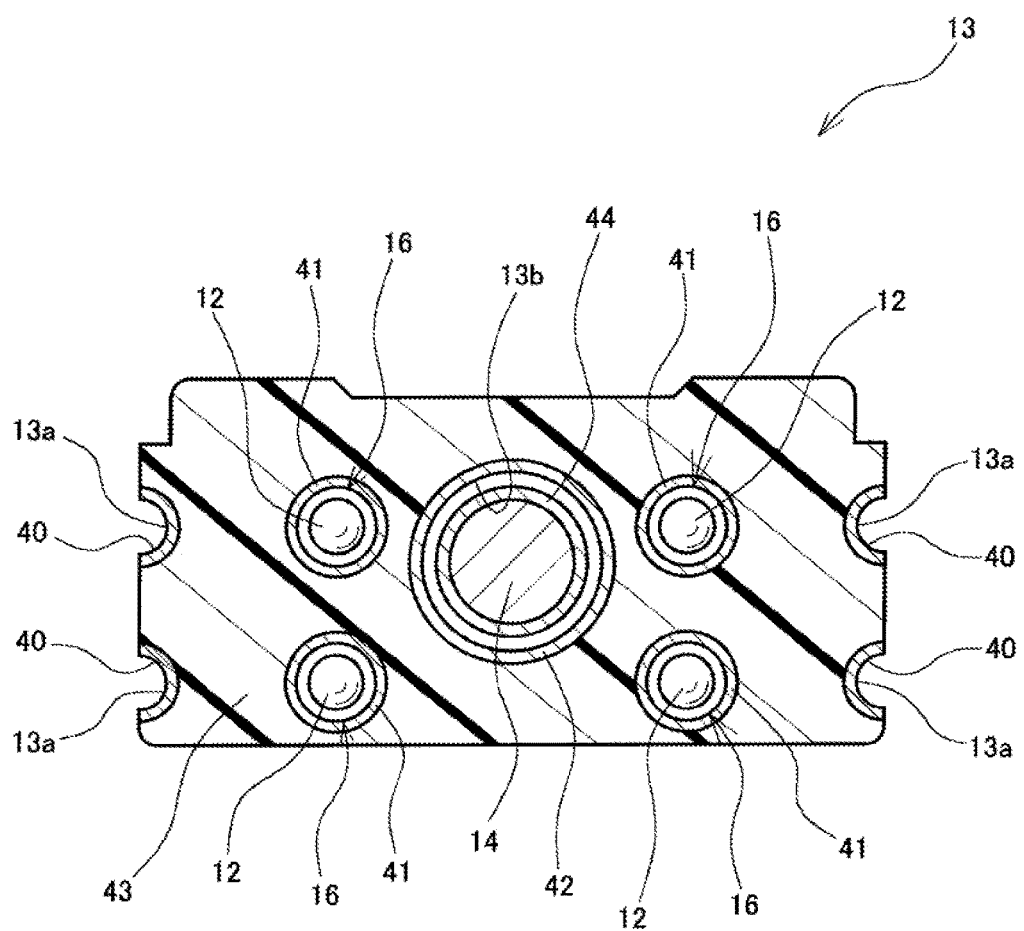
FIG. 4 is a vertical sectional view for explaining a structural example of a movable member to which an embodiment of the present invention is applied.

In the motion guide device 10 according to the first embodiment shown in FIGS. 1, 2 and 3, the track rail 11 alone is formed of a metal material and FRP, but the present invention is not limited to this embodiment, and is also applicable to the movable member 13 or the screw shaft 14 as shown in FIG. 4. That is, it is possible to form the vicinity of the four loaded-rolling-body rolling grooves 13a forming the loaded-rolling-body rolling passages 15 in cooperation with the four rolling-body rolling grooves 11a of the track rail 11 by a rolling part 40 formed of a metal material, to form the vicinity of the four return passages 16 extending in parallel to the four loaded-rolling-body rolling passages 15 by a rolling part 41 formed of a metal material, to form the vicinity of the opening 13b in which the screw shaft 14 is placed via the balls 12 by a rolling part 42 formed of a metal material, or to form the outer peripheral portion of the screw shaft 14 contacting with the balls 12 by a rolling part 44 formed of a metal material, and to form the other portion as a movable body 43 formed of FRP. By forming not only the track rail 11 but also the movable member 13 or the screw shaft 14 by jointing a metal material and FRP in this manner, it is possible to further reduce the weight.

In addition, as the method for jointing the rolling part 30 formed of a metal material and the track body 31 formed of FRP, the rolling parts 40, 41, and 42 formed of a metal material and the movable body 43 formed of FRP, or the rolling part 44 formed of a metal material and the other portion of the screw shaft 14 formed of FRP, any one of adhesive joint, press-fitted joint, and bolted joint, or a combination thereof can be adopted.

For example, in the case of the track rail 11 shown in FIG. 3, it is preferable to perform adhesive joint with an adhesive. Alternatively, in the case of the movable member 13 shown in FIG. 4, it is preferable to perform adhesive joint with an adhesive to the rolling part 40 forming the vicinity of the loaded-rolling-body rolling grooves 13a, and to perform press-fitted joint to the rolling parts 41 and 42 forming the vicinity of the return passages 16 and the vicinity of the opening 13b. In the press-fitted joint, by knurling the outer peripheral surfaces of the rolling parts 41 and 42 or the inner peripheral surfaces of the return passages 16 and the opening 13b, and performing press-fitting, it is possible to securely perform the joint. Furthermore, it is possible to adopt bolted joint to increase joint strength, and it is also possible to adopt a jointing method combining adhesion joint and bolted joint or press-fitted joint and bolted joint as a more secure jointing method. However, in the case of bolted joint, it is necessary to pay attention so that the head of the bolt or the like does not affect the motion of the motion guide device 10. Regarding a member having a shape like the screw shaft 14, an optimal jointing method is appropriately adopted according to the appearance shape, the material, and the like.

The basic structure of the motion guide device 10 according to the first embodiment has been described above with reference to FIGS. 1 to 4. Next, an additional feature of the motion guide device 10 according to the first embodiment will be described with reference to FIGS. 5 to 7. Here, FIG. 5 is an appearance perspective view showing an example of a using state of the motion guide device 10 according to the first embodiment, FIG. 6 is a schematic view for explaining characteristics of FRP that is a constituting member of the motion guide device 10 according to the first embodiment, and FIG. 7 is a view for explaining a main portion of the motion guide device 10 according to the first embodiment.

Figure 5:
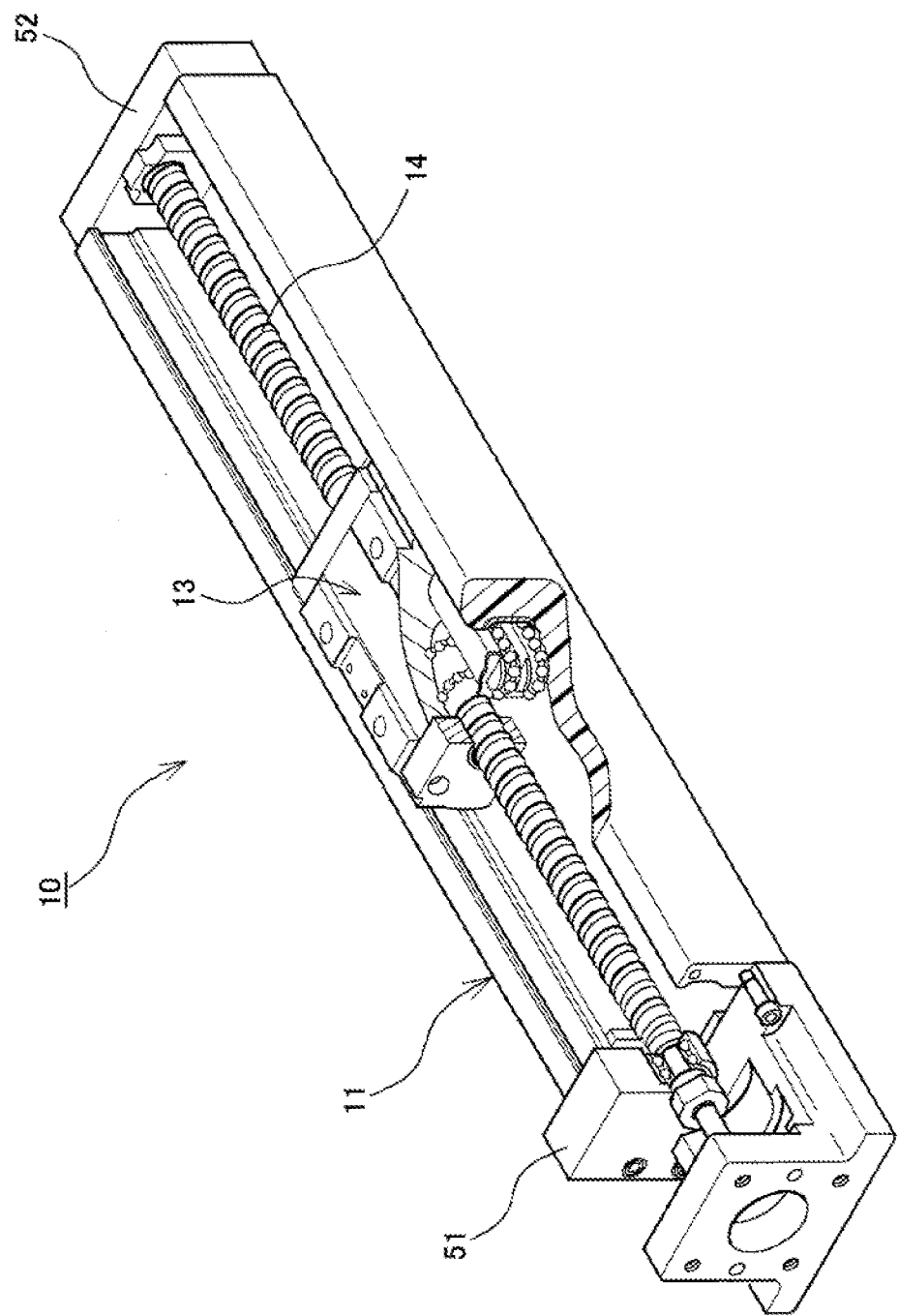
FIG. 5 is an appearance perspective view showing an example of a using state of the motion guide device according to the first embodiment.
Figure 6:
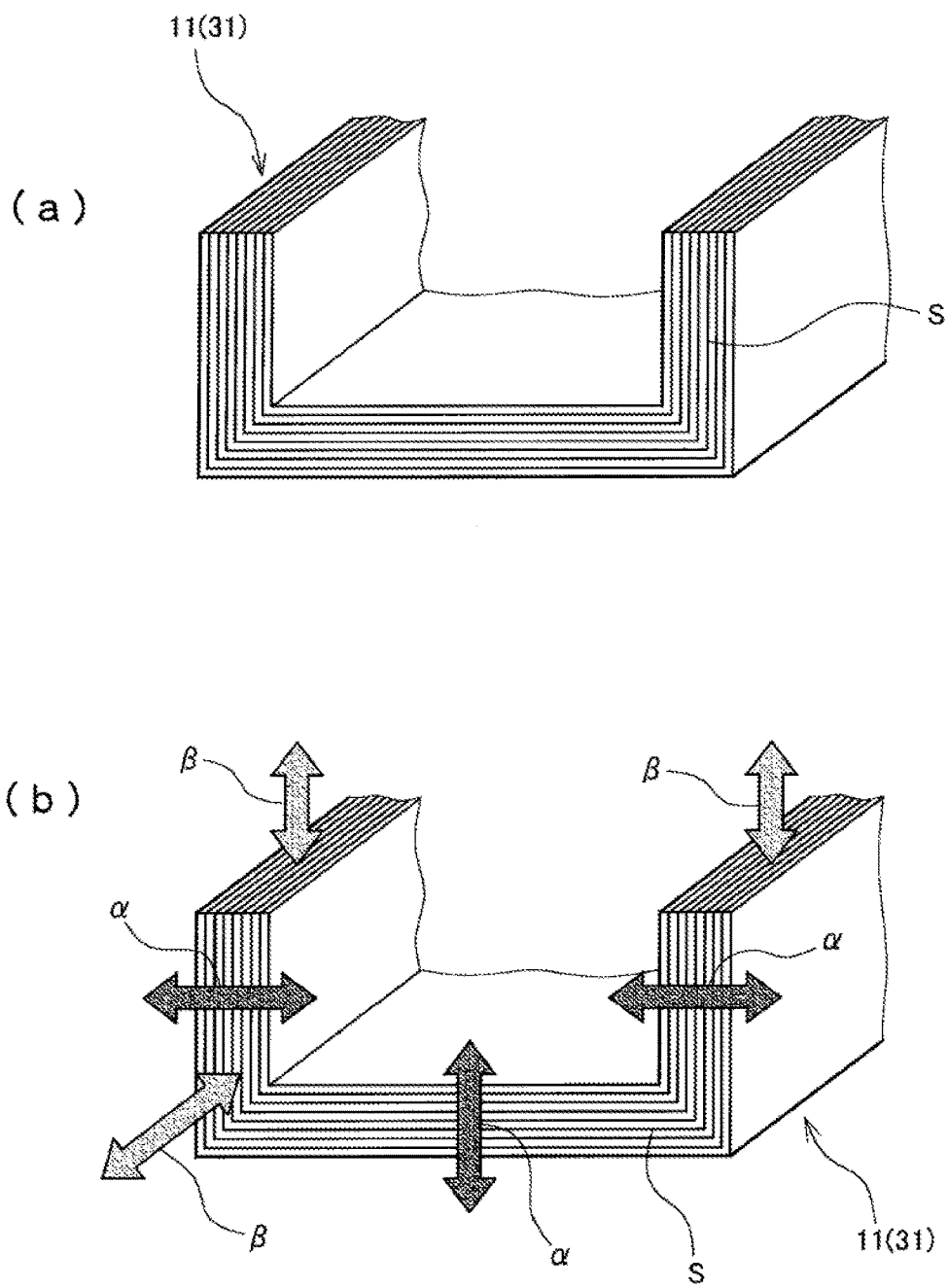
FIG. 6 is a schematic view for explaining characteristics of FRP that is a constituting member of the motion guide device according to the first embodiment.

In the motion guide device 10 according to the first embodiment described above, end housings 51 and 52 are mounted on both end portions in the longitudinal direction of the track rail 11 in some cases as shown in, for example, FIG. 5. The end housings 51 and 52 are members used for supporting the screw shaft 14 which can freely rotate and move, for mounting an external power source, or as an adjustment margin for a constituting member of the motion guide device 10 such as the screw shaft 14. Thus, the end housings 51 and 52 are members necessary to be mounted with higher accuracy than a predetermined value.

However, as described in the paragraphs of the background art, if the end housings 51 and 52 are mounted on both end portions of the FRP track rail 11 in the longitudinal direction simply by boring a screw hole or inserting a helisert, there is a difficulty in ensuring the strength. When the reason for this is explained with reference to FIG. 6, the track body 31 of the track rail 11 according to the first embodiment is formed by laminating a plurality of FRP reinforced fiber sheets S as shown in FIG. 6(*a*). Thus, as shown in FIG. 6(*b*), in the track rail 11 according to the first embodiment, FRP has characteristics that can exert a large strength when a force applies in the direction of the reference sign α which is the direction orthogonal to the lamination direction of the FRP reinforced fiber sheets S, but can exert only a small strength when a force applies in the direction of the reference sign β which is the direction parallel to the lamination direction of the FRP reinforced fiber sheets S. That is, if the end housings 51 and 52 are mounted by boring a screw hole or inserting a helisert in the direction of the symbol β which is the direction parallel to the lamination direction of the FRP reinforced fiber sheets S forming the track rail 11, there is a difficulty in ensuring the strength.

Figure 7:
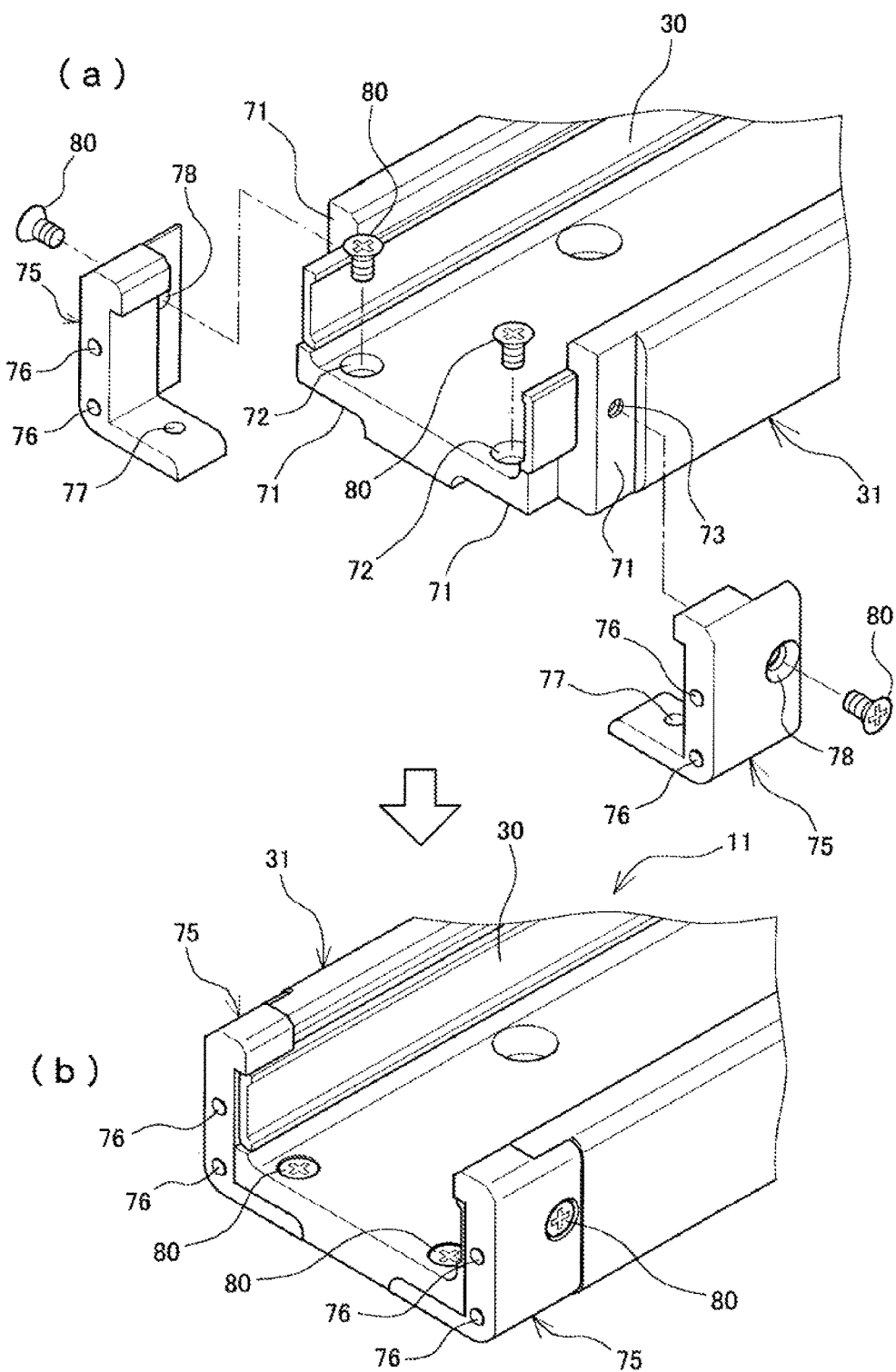
FIG. 7 is a view for explaining a main portion of the motion guide device according to the first embodiment.

In consideration of the above, the inventors have conceived a new structure shown in FIG. 7. That is, a stepped machining portion 71 is formed at the end portion of the track body 31 formed of FRP, and a mounting part 75 formed of a metal material is formed so as to be fitted to the portion where the stepped machining portion 71 is formed. The mounting part 75 is a member in which mounting holes 76 for mounting external members such as the end housings 51 and 52 are formed, and the whole of the mounting part 75 is formed of a metal material. Furthermore, since the stepped machining portion 71 is formed in a shape along the contour shape of the mounting part 75, when the mounting part 75 is fitted to the stepped machining portion 71, the outer shape of the track rail 11 as an elongated member is formed in a smooth contour shape having an even outer dimension.

Moreover, at the portion of the mounting part 75 and the stepped machining portion 71 formed in the track body 31, joint holes 72, 73, 77, and 78 opened in the direction orthogonal to the lamination direction of the FRP reinforced fiber sheets S forming the track body 31 (that is, in the direction of the reference sign α in FIG. 6(*b*)) at the time of the joint are formed.

The joint holes 72, 73, 77, and 78 in the first embodiment are formed so as to be opened in the two directions. The joint holes 72 and 77 are opened in a first direction facing the bottom surface side of the track rail 11 having the substantially U-shaped vertical section, and the joint holes 73 and 78 are opened in a second direction facing the left and right sides of the track rail 11 having the substantially U-shaped vertical section and orthogonal to the first direction. By using the joint holes 72, 73, 77, and 78 which are opened in these two directions, the mounting part 75 can be jointed to the stepped machining portion 71 formed in the track body 31. Note that, as jointing means placed in the joint holes 72, 73, 77, and 78, either of a bolt or a rivet or a combination thereof is used for example, and the jointing means using bolts 80 is exemplified in the first embodiment shown in FIG. 7.

In addition, the end portion of the bolt 80 reaches a member to be screwed with, and the jointing force exerted by the male screw of the bolt 80 is thereby increased. For example, in the relation between the joint holes 72 and 77 opened in the first direction and the bolt 80, by designing the joint hole 72 formed in the stepped machining portion 71 to be larger than the bolt shaft diameter, and forming the female screw only in the joint hole 77 formed in the mounting part 75, the jointing force from the bolt 80 acts only on the mounting part 75, and the track body 31 in which the stepped machining portion 71 is formed can be formed so as to be held between the bolt 80 and the mounting part 75. Similarly, in the relation between the joint holes 73 and 78 opened in the second direction and the bolt 80, by designing the joint hole 78 formed in the mounting part 75 to be larger than the bolt shaft diameter, and forming the female screw only in the joint hole 73 formed in the stepped machining portion 71, the jointing force from the bolt 80 acts only on the stepped machining portion 71, and the mounting part 75 can be formed so as to be held between the bolt 80 and the stepped machining portion 71. With such a structure, since a play margin between the mounting part 75 and the stepped machining portion 71 in the mounting using the jointing means such as the bolts 80, it is possible to easily adjust the mounting position.

Furthermore, since the joint holes 72, 73, 77, and 78 in the first embodiment are opened in the direction orthogonal to the lamination direction of the FRP reinforced fiber sheets S forming the track body 31 (that is, the direction of the reference sign α in FIG. 6(*b*)), the jointing force exerted by the jointing means such as the bolts 80 acts in the direction orthogonal to the lamination direction of the FRP reinforced fiber sheet S. That is, since the track body 31 formed of FRP can receive the strong jointing force exerted by the jointing means such as the bolts 80, it is possible to achieve the stable joint with high accuracy between the track body 31 formed of the FRP and the mounting part 75 formed of a metal material.

Furthermore, when external members such as the end housings 51 and 52 are mounted on the track rail 11 using the mounting hole 76 of the mounting part 75 formed of a metal material, the mounting part 75 is securely fixed to the track body 31 and the mounting hole 76 is formed of a metal material. Thus, the problem in the conventional technique described in the paragraphs of the background art is solved, and it is possible to achieve the state in which external members are securely mounted on the track rail 11 according to the first embodiment with high accuracy.

Moreover, since the mounting part 75 according to the first embodiment is formed of a metal material, it is possible to secure the right angle of the end face of the mounting part 75 by, for example, grinding the end face or the like after the joint to the track body 31. That is, although the accuracy of the outer dimension is not as high as that of a metal material in the case of the track rail formed of FRP alone, by combining the track body 31 formed of FRP and the mounting part 75 formed of a metal material to form the track rail 11 as in the first embodiment, it is possible to provide the track rail 11 having higher accuracy of the outer dimension.

Figure 8:
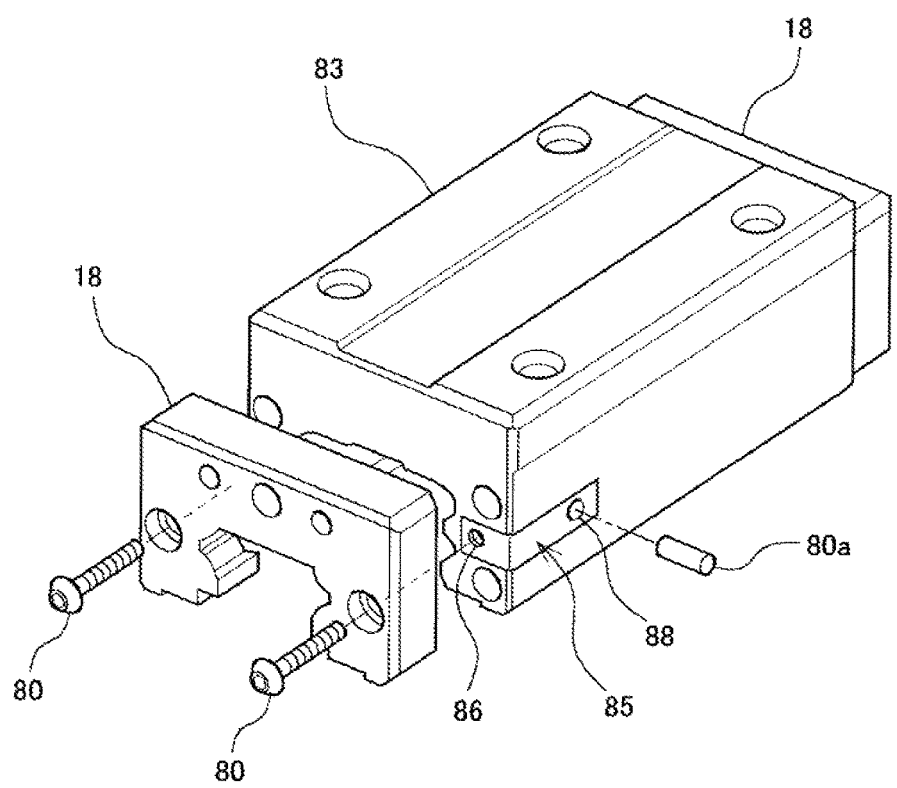
FIG. 8 is a view showing a case in which the first embodiment is applied to a movable member.

The additional feature of the motion guide device 10 according to the first embodiment has been described with reference to FIGS. 5 to 7. Although the feature of the present invention described with reference to FIGS. 5 to 7 is the case of the application to the track rail 11, the feature is also applicable to the movable member 13, and a specific example is shown in FIG. 8. Here, FIG. 8 is a view showing a case in which the first embodiment is applied to a movable member.

In the case of a movable member 83 exemplified in FIG. 8, the whole is formed of CFRP. The lids 18 to be placed on both end faces of the movable member 83 are formed of resin. At this time, if the lids 18 are simply fastened to the movable member 83 with the bolts 80, the bolts 80 are fastened and fixed in the direction parallel to the lamination direction of the CFRP reinforced fiber sheets S, and a small fastening force can only be exerted due to the characteristics of the CFRP forming the movable member 83. Thus, in the case of the embodiment shown in FIG. 8, rectangular notches are formed in the vicinities of both end faces of the movable member 83 formed of CFRP, and fastening metal fittings 85 formed of a metal material are inserted into the notches. A joint hole 88 is formed in the fastening metal fitting 85 in the side face direction at the time of the insertion into the movable member 83 (the obliquely downward direction to the right in FIG. 8), and the opening direction of the joint hole 88 is orthogonal to the lamination direction of the CFRP reinforced fiber sheet S. By inserting a fastening knock pin 80a into the joint hole 88, it is possible to achieve the state in which the fastening metal fitting 85 is securely stably jointed to the movable member 83.

Furthermore, a mounting hole 86 for mounting the lid 18 is formed in the end face direction of the fastening metal fitting 85 (the obliquely downward direction to the left in FIG. 8), and by using the mounting hole 86 and the bolt 80, it is possible to achieve the stable mounting of the resin lid 18 to the CFRP movable member 83.

Similarly to the case of the track rail 11 in the first embodiment, since the fastening metal fittings 85 exemplified in FIG. 8 are also formed of a metal material, it is possible to secure the right angle of the end face by grinding the end face or the like after the joint to the movable member 83. That is, although the accuracy of the outer dimension is not as high as that of a metal material in the case of a movable member formed of CFRP alone, by combining and forming the movable member 83 formed of CFRP and the fastening metal fitting 85 formed of a metal material as in this embodiment, it is possible to provide the movable member 83 having higher accuracy of the outer dimension.

With the motion guide device 10 according to the first embodiment described above, it is possible to provide the motion guide device 10, which is formed of FRP, having the means for securely mounting an external member. According to the motion guide device 10, it is possible to improve the mountability of an external member which is a difficulty in applying FRP, and to further achieve weight reduction while securing the necessary strength which is an advantage of FRP. Note that, although a nonferrous metal represented by aluminum or the like can achieve weight reduction, it has a difficulty in weak strength. That is, while the Young's modulus of iron is 206 GPa, the Young's modulus of aluminum is about 68 GPa. Thus, if a motion guide device is formed of a nonferrous metal represented by aluminum or the like, although weight reduction can be achieved, it is difficult to secure the necessary strength as high as that of an iron-based material.

In contrast, regarding FRP, it is possible to achieve a very high Young's modulus, and it is possible to secure a Young's modulus of CFRP of about 50 to 400 GPa, for example. By using CFRP so as to receive a force in the direction orthogonal to the lamination direction of the CFRP reinforced fiber sheets S as in the first embodiment, it is possible for CFRP to exert strength close to the maximum Young's modulus of 400 GPa. That is, according to the motion guide device 10 to which the present invention is applied, it is possible to improve the mountability of an external member which is a difficulty in applying FRP, and to further achieve weight reduction while securing the necessary strength which is an advantage of FRP.

In addition, since FRP is a material having an excellent damping characteristic, it is possible to exert an advantageous effect when applied to the motion guide device 10. For example, in the case of using the motion guide device 10 in a cantilever manner, it is possible to obtain the effect of shortening the stop time until the vibration stops. That is, when the motion guide device 10 has to be installed in a cantilever manner due to the restriction of a use environment, by the damping characteristic of FRP, it is possible to quickly eliminate vibrations caused by external influence, and to achieve tact-up of the stationary state recovery cycle of the motion guide device 10.

The preferred embodiment of the present invention has been described above, but the technical scope of the present invention is not limited to the scope described in the first embodiment. Various modifications or improvements can be added to the first embodiment.

Figure 9:
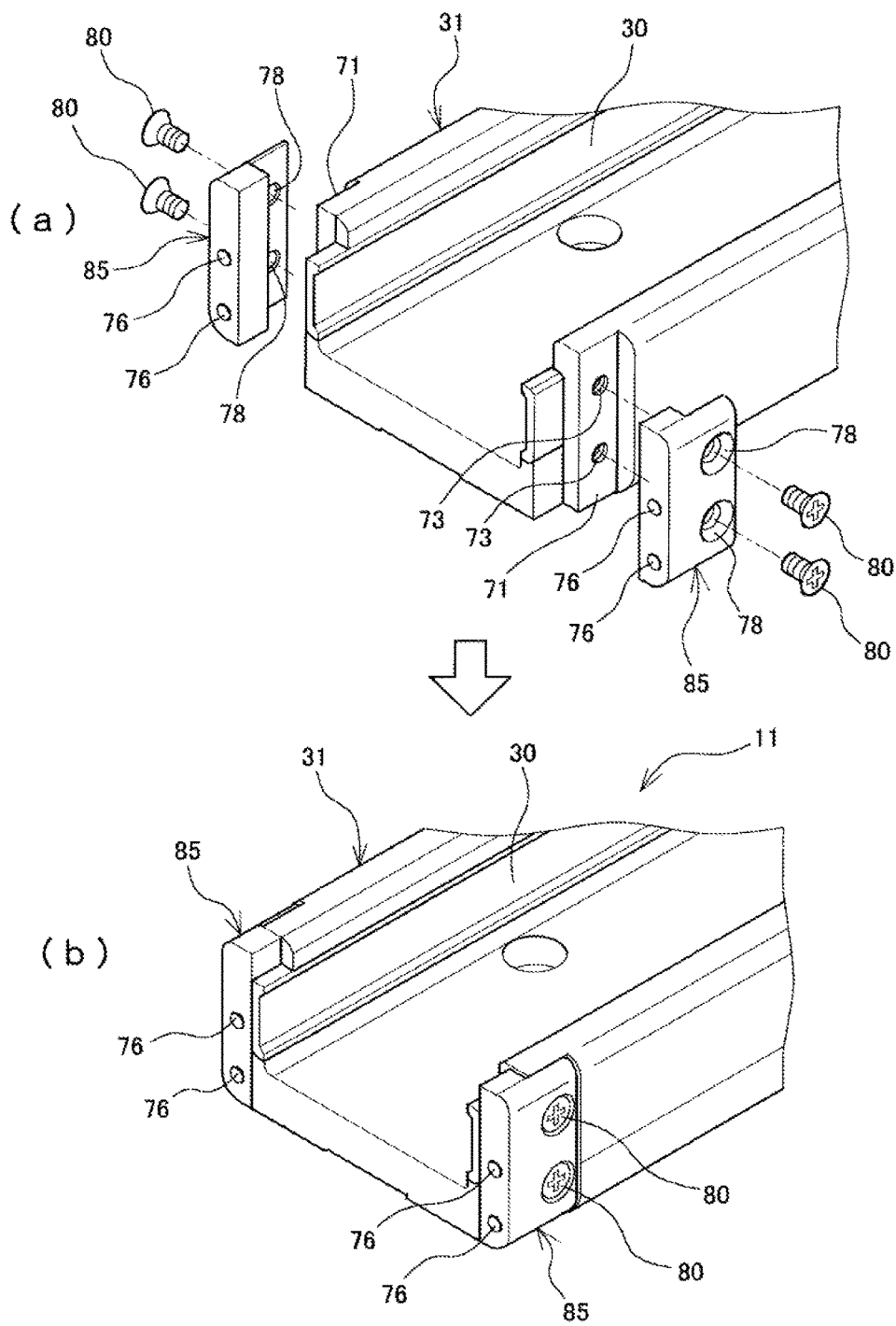
FIG. 9 is a view showing an example of various possible modifications of the motion guide device according to the first embodiment.

For example, in the track rail 11 according to the first embodiment shown in FIG. 7, the mounting part 75 formed of a metal material has a substantially L-shaped outer shape, and the stepped machining portion 71 for mounting the mounting part 75 is formed over the left and right side surfaces and the bottom surface of the track rail 11. However, it is possible to arbitrarily change the shape of the stepped machining portion according to the present invention and the shape of the mounting part to be mounted to the stepped machining portion. For example, as shown in FIG. 9, by forming a stepped machining portion 91 only on the left and right side surfaces of the track rail 11, and a mounting part 95 having a shape along the shape of the stepped machining portion 91 may be mounted by the bolt 80. In the case shown in FIG. 9, since the direction in which the bolt 80 is jointed is the direction orthogonal to the lamination direction of the FRP reinforced fiber sheets S forming the track rail 11, it is possible to achieve the state in which the mounting part 95 is securely jointed to the track rail 11. Note that, FIG. 9 is a view showing an example of various possible modifications of the motion guide device according to the first embodiment, and the descriptions of the same members as or similar members to those in the first embodiment are omitted by assigning the same reference numerals.

Figure 10:
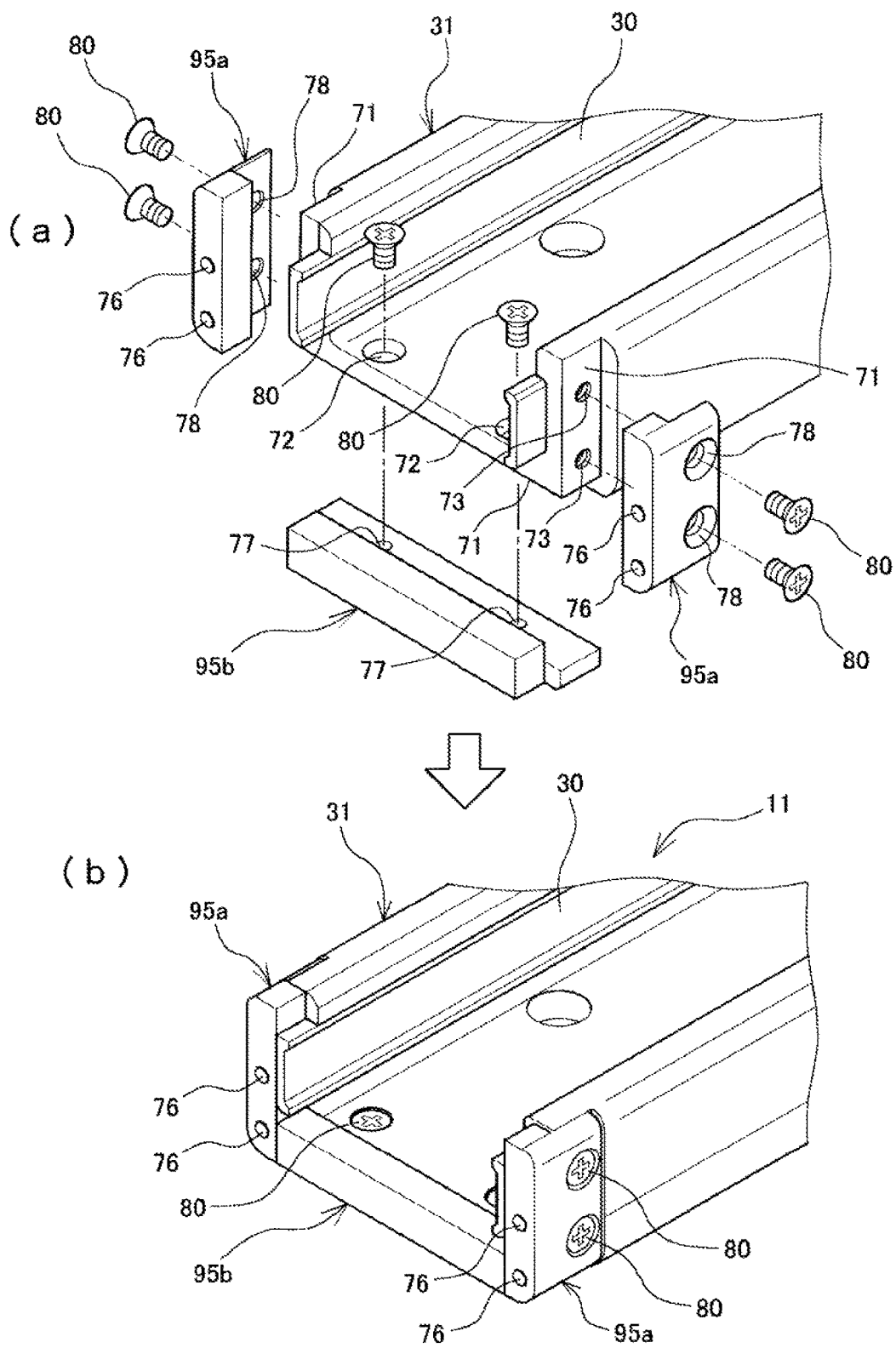
FIG. 10 is a view showing another example of various possible modifications of the motion guide device according to the first embodiment.

Furthermore, for example, similarly to the track rail 11 according to the first embodiment shown in FIG. 7, by forming the stepped machining portion 71 over the left and right side surfaces and the bottom surface of the track rail 11, and a mounting part to be jointed to the stepped machining portion 71 may be divided into two side mounting parts 95a and one bottom mounting part 95b. Such a case is shown in FIG. 10. FIG. 10 is a view showing another example of various possible modifications of the motion guide device according to the first embodiment, and the descriptions of the same members as or similar members to those in the first embodiment are omitted by assigning the same reference numerals. In the case exemplified in FIG. 10, since the joint holes 72, 73, 77, and 78 are opened in the direction orthogonal to the lamination direction of the FRP reinforced fiber sheets S forming the track body 31 (that is, the direction of the reference sign α in FIG. 6(b)), the jointing force exerted by the jointing means such as the bolts 80 acts in the direction orthogonal to the lamination direction of the FRP reinforced fiber sheet S. That is, since the track body 31 formed of FRP can receive the jointing force exerted by the jointing means such as the bolts 80 with strong force, it is possible to achieve the stable joint with high accuracy between the track body 31 formed of the FRP and the side mounting part 95a and the bottom mounting part 95b which are formed of a metal material.

Second Embodiment

Figure 11:
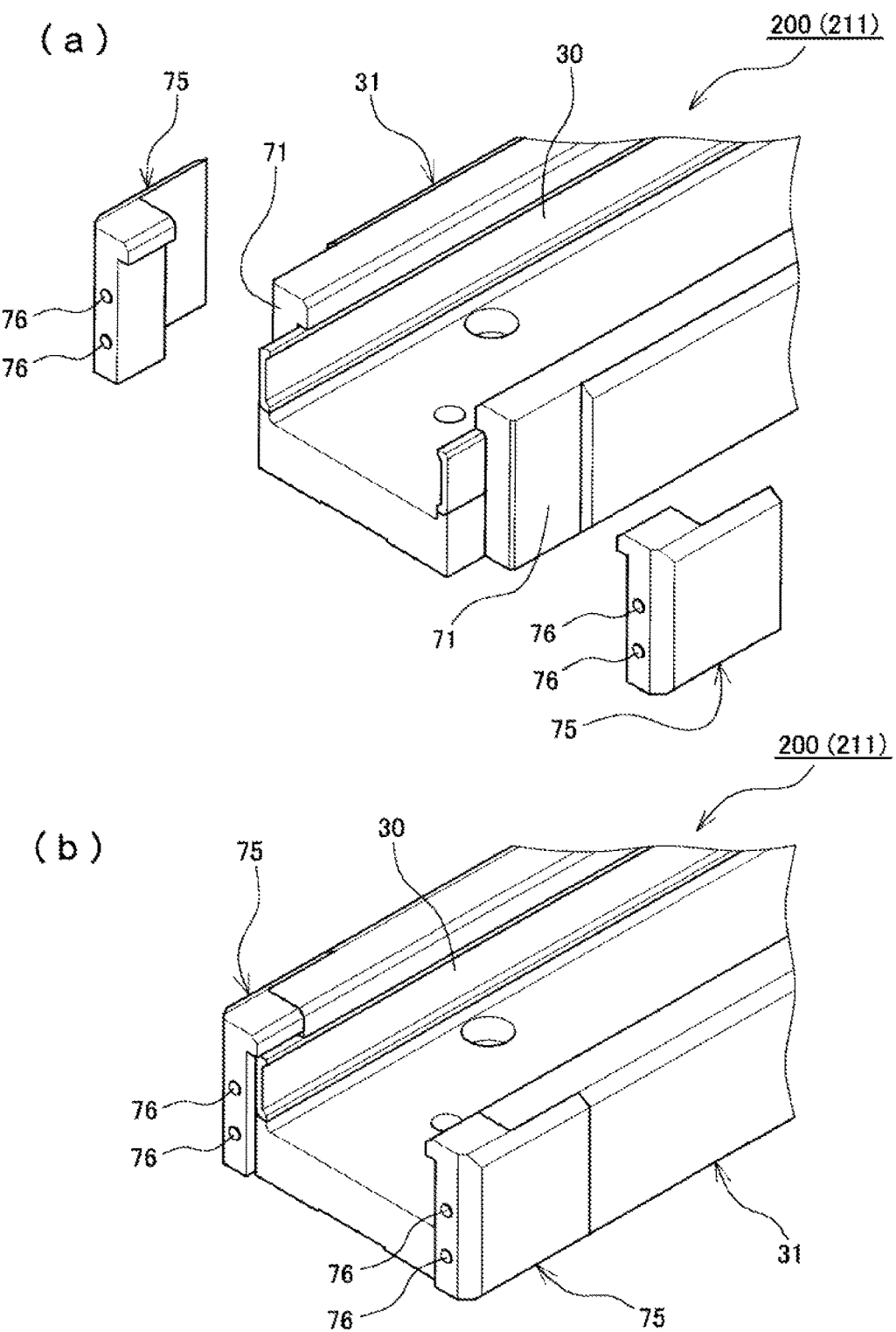
FIG. 11 is a partial perspective view showing a main portion of a motion guide device according to a second embodiment.

Next, as another possible embodiment of the present invention, a motion guide device 200 according to a second embodiment will be described with reference to FIG. 11. Here, FIG. 11 is a partial perspective view showing a main portion of a motion guide device according to the second embodiment; FIG. 11(a) shows that a mounting part is not being mounted to a stepped machining portion, and FIG. 11(b) shows that the mounting part is being mounted to the stepped machining portion. In FIG. 11, the descriptions of the same members as or similar members to those in the first embodiment are omitted by assigning the same reference numerals.

In the motion guide device 200 according to the second embodiment, similarly to the case of the first embodiment, a stepped machining portion 71 is formed at the end portion of a track body 31 formed of FRP, and a mounting part 75 formed of a metal material is jointed so as to be fitted to the portion where the stepped machining portion 71 is formed. However, since an adhesive is used as jointing means in the second embodiment, a structure different from that in the first embodiment is adopted. That is, in the second embodiment, a mounting hole for mounting an external member is not formed in the stepped machining portion 71 formed at the end portion of the track body 31, and the stepped machining portion 71 according to the second embodiment is formed as a joint surface extending in the direction parallel to the lamination direction of FRP reinforced fiber sheets forming the track body 31. Then, by applying an adhesive to the stepped machining portion 71 which is the joint surface, and jointing the mounting part 75, a track rail 211 of the motion guide device 200 according to the second embodiment is manufactured.

In the second embodiment, mounting holes 76 for mounting external members such as end housings 51 and 52 are also formed in the mounting part 75, and the whole of the mounting part 75 is formed of a metal material. Furthermore, since the stepped machining portion 71 is formed in a shape along the contour shape of the mounting part 75, when the mounting part 75 is adhered to the stepped machining portion 71, the outer shape of the track rail 11 as an elongated member is formed in a smooth contour shape having an even outer dimension. Furthermore, in the second embodiment, the adhesive is used as the jointing means, which has an advantage that it is easy to position the mounting part 75 with respect to the stepped machining portion 71. That is, according to the motion guide device 200 according to the second embodiment, it is possible to improve the mountability of an external member which is a difficulty in applying FRP, and to further achieve weight reduction while securing necessary strength which is an advantage of FRP.

Third Embodiment

Figure 12:
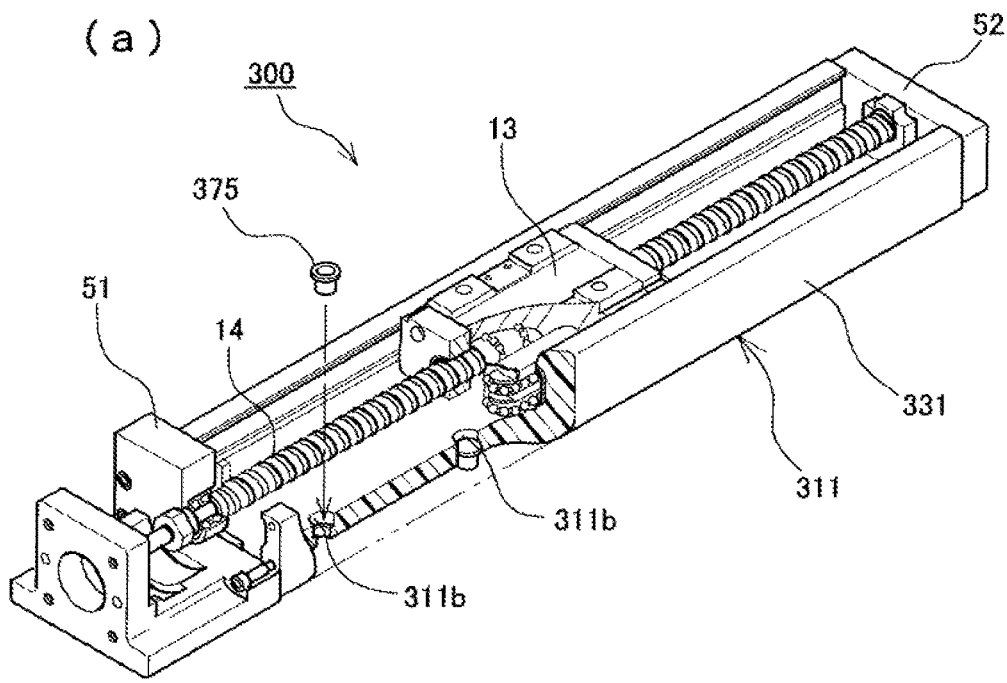
FIG. 12 is a view for explaining a motion guide device according to a third embodiment.
Figure 12:
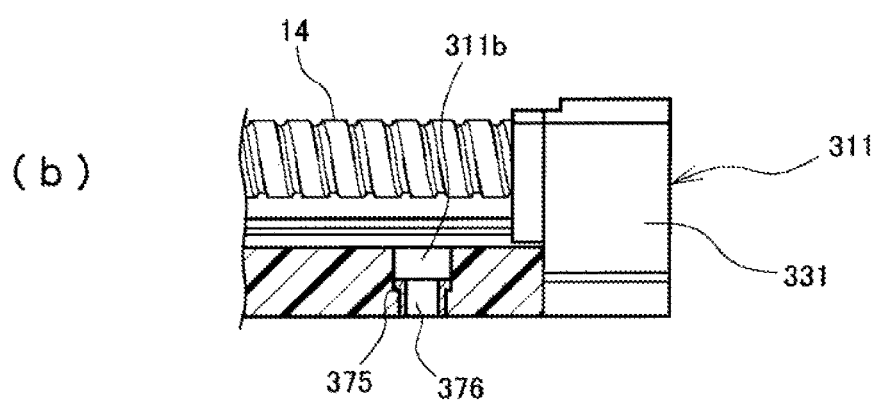
Figure 12:
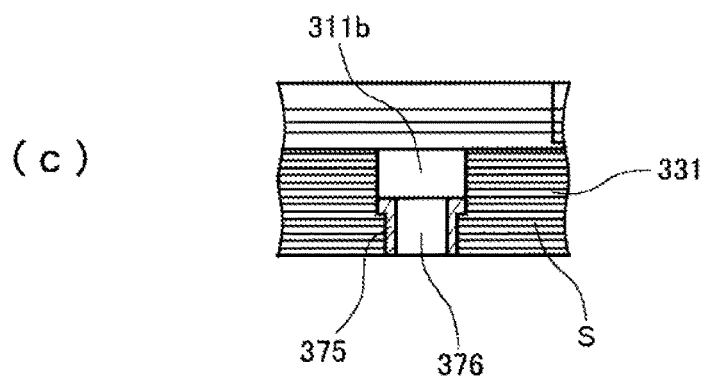
Figure 13:
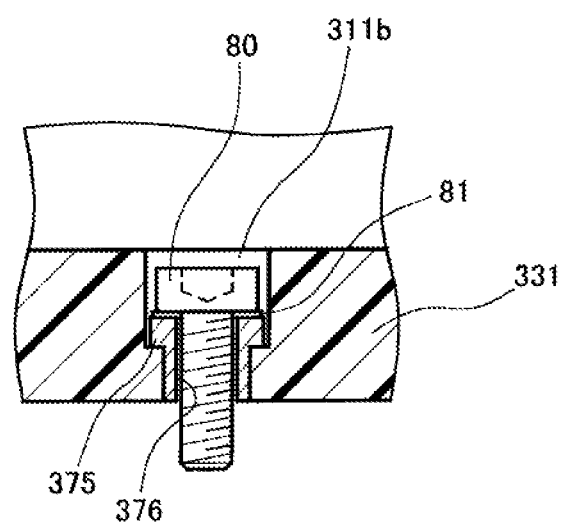
FIG. 13 is a view showing a specific implementation example of the third embodiment.

In the motion guide devices 10 and 200 according to the first and second embodiments described above, by forming the stepped machining portion 71 at the end portion of the track body 31 formed of FRP, the mounting part 75 formed of a metal material is jointed so as to be fitted to the portion where the stepped machining portion 71 is formed. However, the present invention is not applied only to the end portion of the track body 31, and can be applied to, for example, a plurality of bolt mounting holes formed on the bottom surface side of the track rail 11 having a substantially U-shaped vertical section at appropriate intervals in the longitudinal direction of the track rail 11. A specific example will be described with reference to FIGS. 12 and 13. Here, FIG. 12 is a view for explaining a motion guide device according to a third embodiment; FIG. 12(a) is a perspective view showing the overall structure of the motion guide device, FIG. 12(b) is a vertical sectional view of a main portion showing the vicinity of a bolt mounting hole, and FIG. 12(c) is a schematic view for explaining the characteristics of FRP that is a constituting member of a track rail. In addition, FIG. 13 is a view showing a specific implementation example of the third embodiment.

As shown in FIG. 12, in a motion guide device 300 according to the third embodiment, a plurality of bolt mounting holes 311b are formed on the bottom surface side of a track rail 311 having a substantially U-shaped vertical section and at appropriate intervals in the longitudinal direction of the track rail 311. Then, as shown in FIG. 12(b), in the bolt mounting hole 311b according to the third embodiment, the diameter of the hole is changed at the center portion of the bolt mounting hole 311b opened in the vertical direction. In other words, the hole on the upper side of the track rail 311 is formed to have a large opening diameter, while the hole on the lower side of the track rail 311 is formed to have a small opening diameter. That is, in the bolt mounting hole 311b according to the third embodiment, the stepped machining portion according to the present invention is formed. Furthermore, as shown in FIG. 12(c), since the bolt mounting hole 311b having the stepped machining portion is opened in the direction orthogonal to the lamination direction of FRP reinforced fiber sheets S forming the track body 331 (that is, the direction of the reference sign α in FIG. 6(b)), the structure in which FRP can exhibit a large strength is adopted.

A metal collar 375 having a flange portion on the upper side is adhesive-jointed with an adhesive to the bolt mounting hole 311b having the stepped machining portion. This metal collar 375 is a member formed of a metal material in which a mounting hole 376 for mounting an external member is formed, and functions as the mounting part according to the present invention.

By fixing the track rail 311 to the bolt mounting hole 311b and the metal collar 375 according to the third embodiment formed as described above with the bolt 80 as shown in FIG. 13, it is possible to provide the motion guide device 300 that achieves a fixation state as strong as the case of using an iron-based material while FRP that is a weight-reduction material is used. When the bolt 80 is inserted into the metal collar 375 for fastening, it is preferable to use a metallic washer 81 inserted between the upper part of the metal collar 375 and the head part of the bolt 80. At this time, since the bolt mounting hole 311b and the metal collar 375 are strongly jointed and fixed with the adhesive, the metal collar 375 does not corotate due to the rotational force at the time of fastening the bolt 80, and this does not damage the FRP forming the track body 331. Thus, according to the third embodiment, it is possible to provide the motion guide device 300 in which a strong bolt fastening force to the track rail 311 can be stably exerted.

Figure 14:
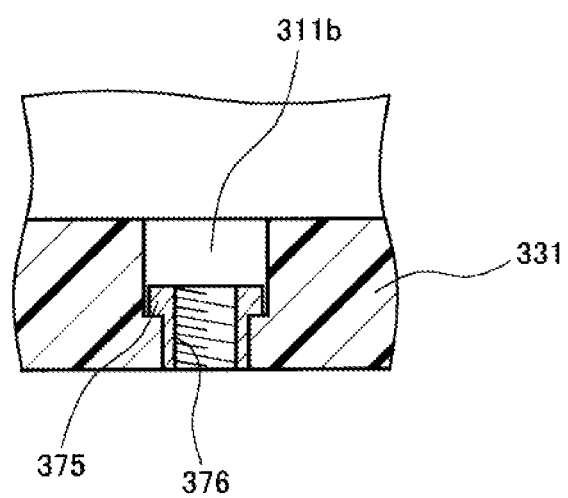
FIG. 14 is a partial vertical sectional view showing an example an improvement of a metal collar according to the third embodiment.

Note that, an improvement as shown in FIG. 14 can be applied to the metal collar 375 according to the third embodiment. Here, FIG. 14 is a partial vertical sectional view showing an example an improvement of the metal collar according to the third embodiment. That is, by tapping the inner peripheral surface of the mounting hole 376 of the metal collar 375 according to the third embodiment to form a screw groove and using the screw groove, the track rail 311 may be mounted. This structure is preferable because the fastening force from the bolt 80 acts more strongly on the metal collar 375 formed of a metal material.

Fourth Embodiment

Figure 15:
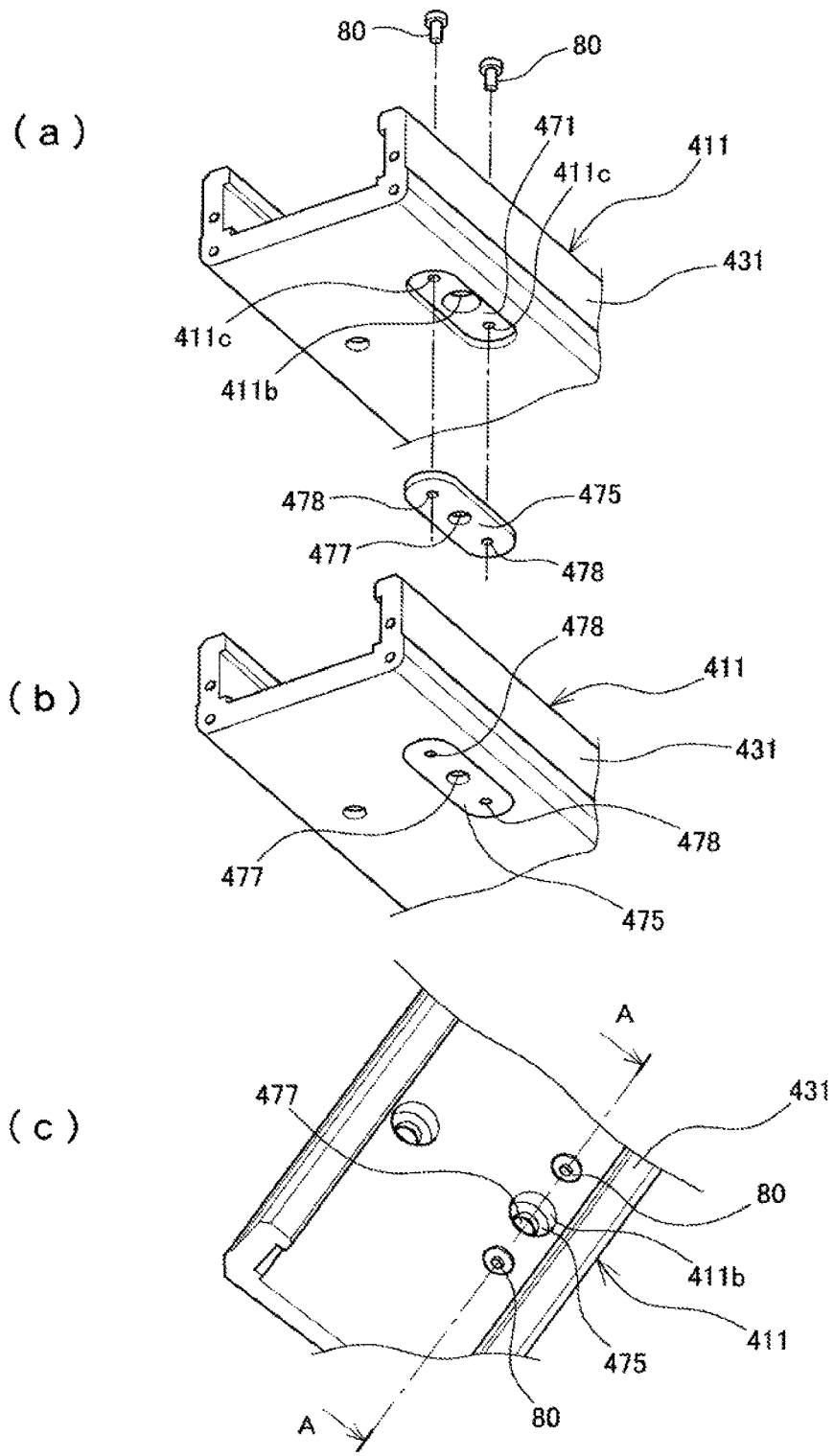
FIG. 15 is a view for explaining a track rail used in a motion guide device according to a fourth embodiment.
Figure 16:
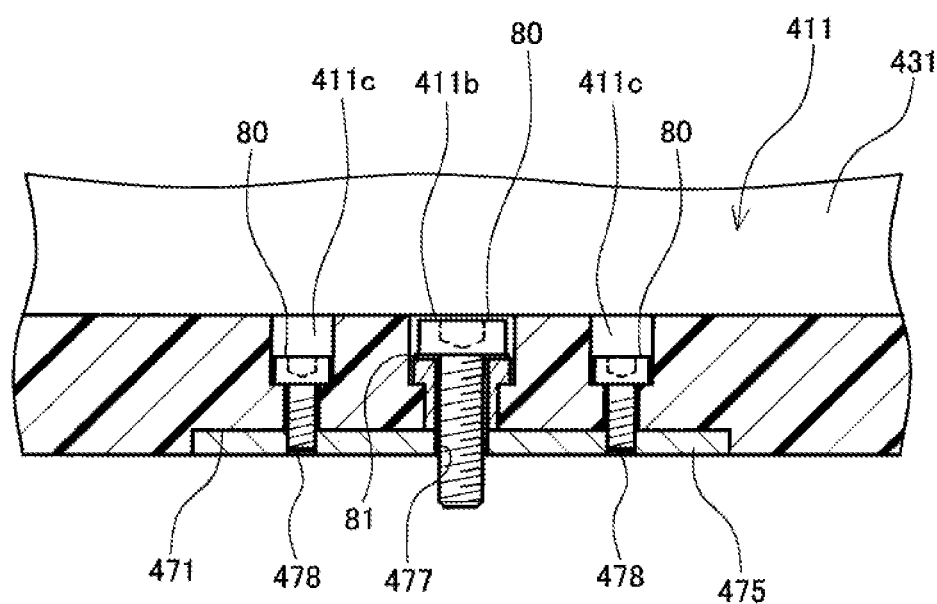
FIG. 16 is a view showing a case in which a bolt as fastening means is placed to a state view showing a section A-A in FIG. 15(c).

In the third embodiment described above, it has been described that the present invention is applied to the bolt mounting holes 311b formed on the bottom surface side of the track rail 311 having a substantially U-shaped vertical section at appropriate intervals in the longitudinal direction of the track rail 311. Further modifications can be applied to the third embodiment. With reference to FIGS. 15 and 16, a motion guide device according to a fourth embodiment will be described. Here, FIG. 15 is a view for explaining a track rail used in the motion guide device according to the fourth embodiment; FIG. 15(a) is an exploded perspective view showing the bottom surface side of the track rail before assembly, FIG. 15(b) is a perspective view showing the bottom surface side of the track rail after assembly, and FIG. 15(c) is a perspective view showing the upper surface side of the track rail after assembly. In addition, FIG. 16 is a view showing a case in which a bolt as fastening means is placed to a state view showing a section A-A in FIG. 15(c).

A track rail 411 used in the motion guide device according to the fourth embodiment has a groove-shaped portion 471, which has a substantially oblong shape, formed on the bottom surface side of the track rail 411 having a substantially U-shaped vertical section, and on the bottom surface side of each portion where a plurality of bolt mounting holes 411b is formed at appropriate intervals in the longitudinal direction of the track rail 411. The groove-shaped portion 471 is a portion having a function as the stepped machining portion according to the present invention. A reinforcing mounting part 475 formed of a metal material shown in FIG. 15(a) is fitted into the groove-shaped portion 471 as the stepped machining portion. A large-diameter joint hole 477 is formed in the center portion of the reinforcing mounting part 475, and two small-diameter joint holes 478 are formed on both sides of the large-diameter joint hole 477. When the reinforcing mounting part 475 is fitted into the groove-shaped portion 471 as the stepped machining portion, the bolt mounting hole 411b formed in the track rail 411 and the large-diameter joint hole 477 overlap each other, and a hole conducts. Bolt holes 411c are formed in front and rear of the portion where the bolt mounting hole 411b is formed in the track rail 411. When the reinforcing mounting part 475 is fitted into the groove-shaped portion 471 as the stepped machining portion, the small-diameter joint holes 478 and the bolt holes 411c overlap each other, and holes conduct. Thus, by fastening the bolts 80 to the small-diameter joint holes 478 using the bolt holes 411c formed in the front and the rear of the position where the bolt mounting hole 411b is formed in the track rail 411, it is possible to strongly fix the reinforcing mounting part 475 to the track body 431 (see FIGS. 15(b), 15(c) and 16).

Furthermore, as shown in FIG. 16, by inserting the bolt 80 to the joint hole 477 and the bolt mounting hole 411b for fastening using the large-diameter joint hole 477 formed in the reinforcing mounting part 475 and the bolt mounting hole 411b formed in the track rail 411, it is possible to strongly fix the track rail 411 to an object to be fixed. In the fourth embodiment, since the fixing force to the object to be fixed mainly acts on the reinforcing mounting part 475, and the fixing force does not substantially reach the track body 431 formed of FRP, it is possible to suitably prevent the track rail 411 from distortion or shape deformation due to the fastening force of the bolt 80, and to achieve the state in which the motion guide device is stably mounted.

The preferred embodiments of the present invention have been described above, but the technical scope of the present invention is not limited to the scope described in the above embodiments. Various modifications or improvements can be added to the above embodiments.

For example, in the first to fourth embodiments, it has been described that the present invention is applied to the motion guide device having an integral structure in which a linear motion guide and a ball screw are combined. However, the present invention is applicable to any motion guide devices such as general rolling bearings used for machine tools, non-lubricant bearings used in vacuum, linear guides, linear guide devices, ball spline devices, ball screw devices, and roller rings.

In the motion guide device according to the first to fourth embodiments, it has been exemplified that the balls 12 as the rolling bodies are configured so as to circulate in the infinite circulation passage 20 in infinitum, but the rolling bodies may be configured as a roller, and the rolling bodies are not limited to the infinite circulation type, and may be a finite circulation type.

Furthermore, in the motion guide device according to the first to fourth embodiments, it has been exemplified that the track rail 11 as the track member and the movable member 13 are placed via the balls 12 as the rolling bodies. However, the present invention is applicable not only to such a device with a rolling guide motion but also to a motion guide device with a sliding motion in which a track member and a movable member are placed without rolling bodies such as balls or rollers.

Moreover, the FRP used in the motion guide device according to the first to fourth embodiments is a material the strength of which is improved by adding reinforced fiber such as glass fiber to synthetic resin, but the molding method of FRP is not limited in the application to the present invention. That is, FRP, to which the present invention is applicable, manufactured by any molding method, such as a hand lay up method in which reinforced fiber are laid in a mold and a resin mixed with a curing agent is repeatedly laminated while defoaming, a spray up method, or a sheet molding compounds (SMC) press method in which a sheet mixture of reinforced fiber and resin is compressed and molded with a metal mold, can be used.

Figure 17:
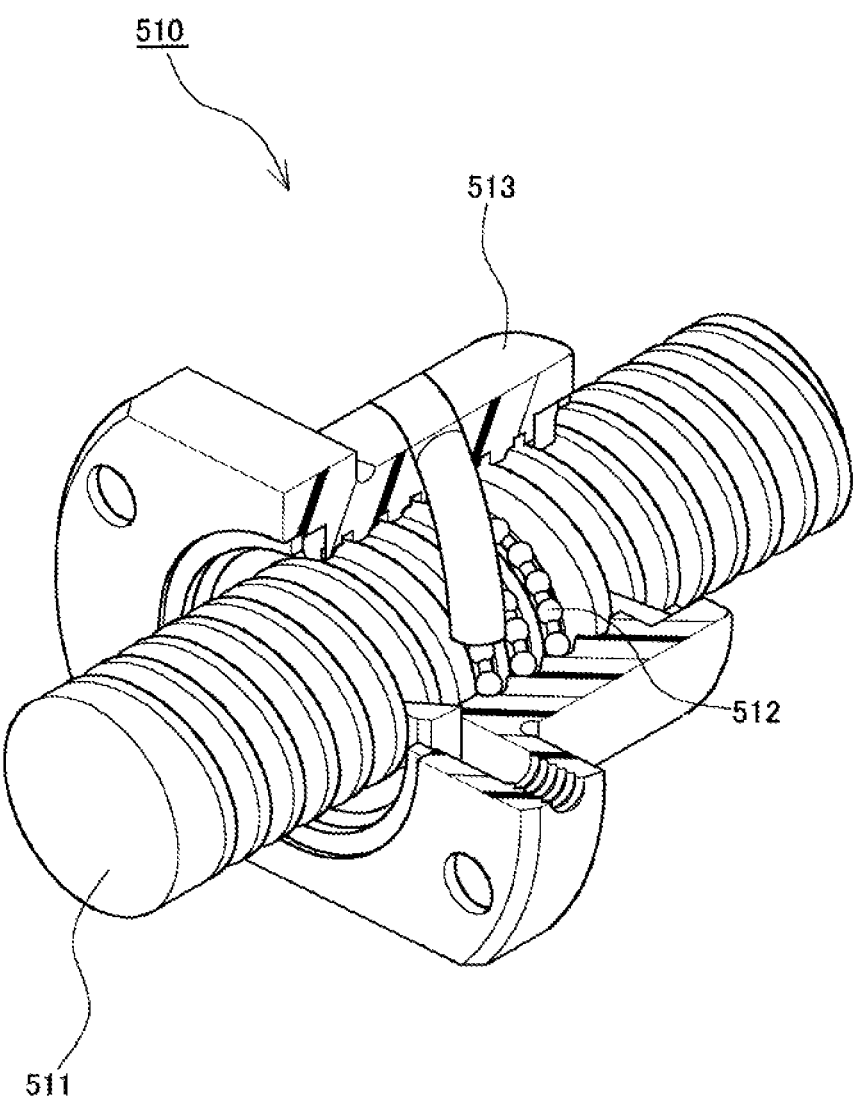
FIG. 17 is a view exemplifying a case in which a motion guide device in accordance with an embodiment of the present invention is configured as a ball screw device.

Note that, the motion guide device according to each embodiment can be configured as a ball screw device as shown in FIG. 17, for example. Here, FIG. 17 is a view exemplifying a case in which the motion guide device according to the present invention is configured as a ball screw device. In other words, the motion guide device according to the present invention can be configured as a ball screw device 510 having a screw shaft 511 as a track member and a nut 513 as a movable member mounted to the screw shaft 511 so as to be relatively rotatable via a plurality of balls 512, the vicinity of a rolling body rolling surface where the screw shaft 511 or the nut 513 contacts with the balls 512 can be formed of a metal material, and the other portion can be formed of FRP. The ball screw device can also be configured so that a mounting part and a track body or a movable body each have a joint hole opened in the direction orthogonal to the lamination direction of FRP reinforced fiber sheets forming the track body or the movable body at the time of the joint, and can be jointed using jointing means placed in the joint holes. By configuring the ball screw device 510 in this manner, it is possible to provide a motion guide device that achieves a state in which an external member is securely mounted with high accuracy and weight reduction of the device.

It is obvious from the description of claims that such modifications or improvements can be included in the technical scope of the present invention.

REFERENCE NUMERALS 10, 200, 300: motion guide device, 11, 211, 311, 411: track rail, 11a: rolling-body rolling groove, 11b, 311b, 411b:

bolt mounting hole, 12: ball, 13, 83: movable member, 13*a*: loaded-rolling-body rolling groove, 13*b*: opening, 13*c*: upper surface, 13*d*: female screw, 14: screw shaft, 15: loaded-rolling-body rolling passage, 16: return passage, 17: direction change passage, 18: lid, 19: non-loaded-rolling-body rolling passage, 20: infinite circulation passage, 21: spacer member, 30, 40, 41, 42, 44: rolling part, 31, 331, 431: track body, 43: movable body, 51, 52: end housing, 71, 91: stepped machining portion, 72, 73, 77, 78, 88, 477, 478: joint hole, 75, 95: mounting part, 76, 86: mounting hole, 80: bolt, 80*a*: fastening knock pin, 81: washer, 85: fastening metal fitting, 95*a*: side mounting part, 95*b*: bottom mounting part, 375: metal collar, 376: mounting hole, 411*c*: bolt hole, 471: groove-shaped portion, 475: reinforcing mounting part, 510: ball screw device, 511: screw shaft, 512: ball, 513: nut, S: reinforced fiber sheet

The invention claimed is:

1. A motion guide device comprising:
    a track member; and
    a movable member mounted on the track member so as to freely move via a plurality of rolling bodies, wherein
    the track member or the movable member comprises:
    a rolling part formed of a metal material contacting with the plurality of rolling bodies and forming a rolling body rolling surface;
    a mounting part formed of a metal material having a mounting hole for mounting an external member; and
    a track body or a movable body formed of FRP (fiber reinforced plastics) jointed with the rolling part and the mounting part to form the track member or the movable member, and
    the mounting part and the track body or the movable body each have a joint hole opened in a direction orthogonal to a lamination direction of FRP reinforced fiber sheets forming the track body or the movable body, and are jointed using jointing means placed in the joint holes.

2. The motion guide device according to claim 1, wherein the track body or the movable body has a stepped portion formed along a shape of the mounting part at a portion where the mounting part is to be jointed.

3. The motion guide device according to claim 1, wherein the jointing means is any one of or a combination of a bolt, a rivet, and an adhesive.

4. The motion guide device according to claim 1, wherein
    the track member is formed as a member having a substantially U-shaped section, and
    a plurality of the joint holes is formed so as to be opened in at least two directions, the at least two directions including a first direction facing a bottom surface side of the substantially U-shaped section, and a second direction facing a left and right surface sides of the substantially U-shaped section and orthogonal to the first direction.

5. An actuator incorporating the motion guide device according to claim 1.

6. A motion guide device comprising:
    a track member; and
    a movable member mounted on the track member so as to freely move via a plurality of rolling bodies, wherein
    the track member or the movable member comprises:
    a rolling part formed of a metal material contacting with the plurality of rolling bodies and forming a rolling body rolling surface;
    a mounting part formed of a metal material having a mounting hole for mounting an external member; and
    a track body or a movable body formed of FRP (fiber reinforced plastics) jointed with the rolling part and the mounting part to form the track member or the movable member, and
    the mounting part and the track body or the movable body each have a joint surface extending in a direction parallel to a lamination direction of FRP reinforced fiber sheets forming the track body or the movable body, and are jointed using jointing means applied to the joint surfaces.

* * * * *